United States Patent Office 3,331,761
Patented July 18, 1967

3,331,761
PHOTOPOLYMERIZATION OF ACRYLIC RESINS USING ULTRAVIOLET LIGHT AND TRIPHENYLPHOSPHINE AS PHOTOPOLYMERIZATION INITIATORS
Tzu J. Mao, Royal Oak, Mich., assignor to General Motors Corporation, Detroit, Mich., a corporation of Delaware
No Drawing. Filed June 25, 1964, Ser. No. 378,043
7 Claims. (Cl. 204—159.23)

ABSTRACT OF THE DISCLOSURE

This invention relates to a process for the production of acrylic resins. Polymerizable acrylic monomer solutions containing a small but effective amount of triphenylphosphine readily polymerize upon exposure to ultraviolet light. The triphenylphosphine acts as a photopolymerization initiator.

This invention relates to the use of an initiator in the photopolymerization of monomers, and more particularly to the use of triphenylphosphine as the initiator in the photochemical polymerization of acrylic monomers.

It is known that acrylic monomers may be polymerized by the action of ultraviolet light. In such polymerization reactions the rate of polymerization and also the length of the polymer chain produced are dependent on the nature and concentration of the acrylic monomer, the nature and concentration of an initiator, on the intensity and wavelength of the light, as well as the reaction temperature. The function of the photo-initiators is extremely important since they have a very pronounced effect on the chain length of the polymers that are formed, thereby directly affecting the molecular weight of the polymer. A significant disadvantage encountered in the photopolymerization of a particular monomer is that frequently it is not possible to obtain a polymer of as high a molecular weight as is sought within a reasonable reaction time.

It is the object of this invention to provide a novel initiator for the photopolymerization of acrylic monomers. It is a further object to provide a process for the production of polymeric materials by the photopolymerization of acrylic monomers in which the rate of polymerization is markedly increased for a given light intensity of the appropriate wavelengths. It is yet another object to provide a novel initiator which will permit polymers of higher molecular weight to be prepared from a particular acrylic monomer. These and other objects are accomplished by incorporating small but effective amounts of triphenylphosphine in the acrylic monomer and subjecting the solution to ultraviolet radiation until the polymerization has been effected.

Further objects and advantages of the present invention will be apparent from the following detailed description, reference being had to the following examples wherein preferred embodiments of the present invention are clearly shown.

The process of the present invention will hereinafter be described in detail in terms of incorporating triphenylphosphine as the initiator in the photopolymerization of various acrylic monomers. In general, a suitable amount of triphenylphosphine is dissolved in the acrylic monomer and stirred until a homogeneous solution is obtained. If the acrylic monomer used has a sufficiently low vapor pressure, the solution may be placed in an open reaction receptacle under atmospheric pressure; however, if the acrylic monomer has a high vapor pressure, it may be necessary to place the solution in a closed vessel under a suitable superimposed pressure in order to prevent excessive loss of the monomer due to volatilization. If a volatile acrylic monomer under superimposed pressure is to be polymerized, the reaction vessel should be constructed of a material which will permit the maximum amount of ultraviolet radiation to pass through the reaction vessel. The reaction vessel should not be constructed of soft glass since soft glass will not transmit wavelengths below 3,500 Angstroms. Pyrex glass will not transmit below about 3,000 Angstroms. Vycor test tubes and reaction vessels are constructed of material which will permit lower wavelength radiation to pass through; these reaction vessels are frequently used in the laboratory for photochemical polymerization. The reactions of this invention in which a volatile acrylic monomer was used were carried out in Vycor test tubes which were loosely corked or which were fitted with a stopcock. The purpose of the cork is to prevent excessive volatilization and at the same time to prevent excessive pressures from building up in the system. Vycor test tubes which were fitted with a stopcock were used primarily when it was desired to carry out the reaction in an oxygen-free atmosphere, such as nitrogen. To perform the reaction in a nitrogen atmosphere, it was first necessary to evacuate the system to a low pressure and then to flush it with a nitrogen atmosphere. This procedure is repeated three or four times to insure that all traces of air and/or oxygen have been removed. The initiator containing acrylic solution is then subjected to ultraviolet light by means of an ultraviolet lamp (Hanovia) with a high pressure, mercury vapor arc tube providing radiations with wavelengths ranging from 1,849 Angstroms to 4,000 Angstroms positioned a distance of one to two inches from the solution for periods of time ranging from a few minutes to several hours. As will hereinafter appear, clear, tough, solid polymers are obtained when triphenylphosphine was used as the initiator in the photopolymerization of acrylic monomers. A basic advantage obtained in the use of triphenylphosphine as the initiator is that a markedly higher molecular weight polymer is formed from a given monomer.

Example 1

| | Parts by weight |
|---|---|
| Triphenylphosphine | 10 |
| Glycidyl methacrylate | 500 |

The solution of these two components was prepared and placed in an aluminum dish at room temperature. The monomeric material was then subjected to radiation from an ultraviolet lamp which was positioned a distance of one to two inches from the solution. In 7 minutes the liquid monomer turned into a clear, tough solid. The yield of the polymer was 70%.

Example 2

| | Parts by weight |
|---|---|
| Triphenylphosphine | 10 |
| 2-methoxyethyl methacrylate | 1000 |

The solution of these two components was placed in a Vycor test tube, it was irradiated with ultraviolet light for one hour and a clear, tough solid was obtained. The yield of the polymer in this reaction was over 90%.

Example 3

| | Parts by weight |
|---|---|
| Triphenylphosphine | 10 |
| t-Butylaminoethyl methacrylate | 900 |

The solution of these two components was placed in a Vycor test tube; the solution was then subjected to ultraviolet radiation for one hour. The polymer was precipitated with normal heptane, redissolved in acetone, and dried to yield a clear, tough solid. The yield of the polymer in this reaction was 55%.

Example 4

| | Parts by weight |
|---|---|
| Triphenylphosphine | 10 |
| Methyl methacrylate | 900 |

The solution of these two components was placed in a Vycor test tube and loosely corked. The solution was then subjected to ultraviolet radiation for one hour and a clear, tough solid was obtained. The yield of the polymer in this reaction was 9%.

Example 5

| | Parts by weight |
|---|---|
| Triphenylphosphine | 10 |
| Methyl acrylate | 400 |

The solution of these two components was placed in a Vycor test tube and loosely corked. The solution was then subjected to ultraviolet radiation for 10 minutes and a clear, tough, rubbery solid was obtained. The yield of the polymer in this reaction was over 95%.

Example 6

| | Parts by weight |
|---|---|
| Triphenylphosphine | 10 |
| Lauryl acrylate | 800 |

The solution of these two components was placed in a Vycor test tube and loosely corked. The solution was then subjected to ultraviolet radiation for 10 minutes and a clear, tough, rubbery solid was obtained. The yield of the polymer in this reaction was over 95%.

Example 7

| | Parts by weight |
|---|---|
| Triphenylphosphine | 10 |
| Stearyl methacrylate | 800 |
| Benzene | 800 |

The solution of these two components was placed in a Vycor test tube and loosely corked. After 2.5 hours of irradiation with ultraviolet light, the solution became very viscous. The polymer was precipitated with ethyl alcohol and the yield was 70%.

Example 8

| | Parts by weight |
|---|---|
| Triphenylphosphine | 10 |
| Isobutyl methacrylate | 900 |

The solution of these two components was placed in a Vycor test tube which was fitted with a stopcock; it was degassed and flushed three times with nitrogen until the solution was blanketed under an atmosphere of nitrogen. It was then irradiated under the nitrogen atmosphere with ultraviolet light at a temperature of 20° C. for a period of 1.5 hours. The polymer was precipitated with ethyl alcohol and the yield was 14%.

TABLE I.—THE EFFECT OF AN INITIATOR ON THE MOLECULAR WEIGHT OF POLY(METHYL METHACRYLATE)

| Initiator Concentration Percent by Weight | Atmosphere | | Molecular Weight of Poly(Methyl Methacrylate) | |
|---|---|---|---|---|
| | Air | Nitrogen | Initiator Triphenylphosphine | Initiator Benzoyl Peroxide |
| 0.25 | X | | 290,000 | 90,000 |
| 0.25 | | X | 316,000 | 100,000 |
| 0.50 | X | | 345,000 | 80,000 |
| 0.50 | | X | 390,000 | 85,000 |

As indicated by the above examples, triphenylphosphine is an effective initiator for the photopolymerization of a broad class of acrylic monomers. When the photopolymerization is carried in an air atmosphere, the useful range of triphenylphosphine concentration was found to be 0.08 to 2.0 percent by weight with the preferred concentration being about 1.0 percent by weight. Since oxygen interferes with the photopolymerization of acrylic monomers, it is frequently preferable or necessary to carry out the polymerization in an oxygen-free atmosphere such as nitrogen, carbon dioxide, helium, argon, and so forth. When the photopolymerization is carried out in an oxygen-free atmosphere the rate of reaction is faster, the polymer that is formed has a higher molecular weight, and the yield of the polymer is much higher. If the reaction is carried out in an oxygen-free atmosphere, such as nitrogen, as is indicated in Example 8, the required initiator concentration range is lower, between 0.003 to 1.1 percent by weight with the preferred concentration being about 0.5 percent by weight. In general, the use of an oxygen free atmosphere reduces the proportion of the triphenylphosphine needed.

Triphenylphosphine is an effective initiator for the photopolymerization of methyl methacrylate as indicated in Example 4. An attempt to initiate the polymerization of methyl methacrylate with triphenylphosphine as the initiator at the same concentration ratio as in Example 4, but by thermal means instead of by ultraviolet radiation, that is by heating the acrylic solution containing triphenylphosphine in a water bath at 70° C. for 10 hours, failed to yield any polymer whatsoever. Triphenylphosphine does initiate photopolymerization of methyl methacrylates as is indicated in Example 4, but it does not initiate the thermal polymerization of methyl methacrylate as indicated above.

Triphenylphosphine will work as an initiator in the photopolymerization when the acrylic monomer has been diluted with a solvent such as benzene as is indicated in Example 7. A desirable superior property that triphenylphosphine possesses as an initiator when compared with other initiators such as benzoyl peroxide is that for the polymerization of a given monomer a higher molecular weight polymer is obtained when triphenylphosphine is used as is indicated in Table I. In many instances it is desirable or necessary to obtain a polymer which has the highest molecular weight possible. Such a polymer is more desirable in making acrylic resin coatings because it is tougher and more resistant to solvents.

As was mentioned earlier, triphenylphosphine is an effective photopolymerization initiator for a broad class of acrylic monomers; however, when triphenylphosphine was used as an initiator in the photopolymerization of other monomers that had the vinyl type linkage available for polymerization similar to the acrylic monomers such as styrene, butadiene, ethyl crotonate, methacrylonitrile, and vinyl acetate, a reaction did not take place. Triphenylphosphine selectively initiates only the photopolymerization of acrylic type monomers as was indicated from the examples and discussion above.

Included in the term acrylic monomer as used herein, as illustrated in the examples, refers to esters of acrylic acid or methacrylic acid. These esters are formed by reacting one of the acids mentioned above with an alcohol or a substituted alcohol containing one to eighteen carbon atoms. Suitable alcohols include methyl alcohol, butyl alcohol, hexyl alcohol, 2-ethylhexyl alcohol, decyl-octyl alcohol, lauryl alcohol, stearyl alcohol, dimethylaminoethyl alcohol, t-butylaminoethyl alcohol, glycidyl alcohol, 2-methoxyethyl alcohol hydroxyethyl alcohol, and hydroxypropyl alcohol.

While the embodiments of the present invention herein disclosed constitute preferred forms, it is to be understood that other forms might be adopted.

What is claimed is as follows:

1. A process for the production of polymeric material which comprises irradiating an acrylic monomer taken from the group consisting of the esters of acrylic acid and the esters of methacrylic acid with ultraviolet light in the presence therein of a small but effective amount of triphenylphosphine sufficient for said production of said polymeric material.

2. A process according to claim 1 in an air atmosphere wherein said triphenylphosphine is employed in an amount within the range of from 0.08 to 2.0 percent by weight of the acrylic monomer.

3. A process according to claim 1 in an oxygen free atmosphere wherein said triphenylphosphine is employed in amounts within the range of from 0.003 to 1.1 percent by weight of the acrylic monomer.

4. A process according to claim 1 wherein said acrylic monomer is methyl methacrylate.

5. A process according to claim 1 wherein said acrylic monomer is glycidyl methacrylate.

6. A process according to claim 1 wherein said acrylic monomer is 2-methoxyethyl methacrylate.

7. In the photopolymerization of an acrylic monomer taken from the group consisting of the esters of methacrylic acid and the esters of acrylic acid, the improvement in the rate of polymerization which comprises employing a small but effective amount of triphenylphosphine in the acrylic monomer sufficient to affect said photopolymerization of said acrylic monomer which is then subjected to ultraviolet radiation.

References Cited

UNITED STATES PATENTS

| | | | |
|---|---|---|---|
| 2,524,432 | 10/1950 | Dorough | 260—348 |
| 2,647,080 | 7/1953 | Joyce | 204—159.23 |
| 3,240,765 | 3/1966 | Middleton | 260—79 |

SAMUEL H. BLECH, *Primary Examiner.*

R. B. TURER, *Assistant Examiner.*